US006859574B2

(12) United States Patent
Doerr et al.

(10) Patent No.: US 6,859,574 B2
(45) Date of Patent: Feb. 22, 2005

(54) N×N SWITCHING ARRANGEMENT OF TWO PLANAR ARRAYS WITHOUT WAVEGUIDE CROSSINGS

(75) Inventors: Christopher R. Doerr, Middletown Township, Monmouth County, NJ (US); Corrado P. Dragone, Little Silver Township, Monmouth County, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 144 days.

(21) Appl. No.: 10/115,828

(22) Filed: Apr. 3, 2002

(65) Prior Publication Data
US 2003/0190112 A1 Oct. 9, 2003

(51) Int. Cl.[7] .................................................. G02B 6/35
(52) U.S. Cl. ........................ 385/17; 385/33; 385/130
(58) Field of Search ...................... 385/16–18, 119–120, 385/31–35, 37, 14, 130, 131

(56) References Cited

U.S. PATENT DOCUMENTS

| | | | | |
|---|---|---|---|---|
| 4,164,934 A | * | 8/1979 | Anderson ...................... 126/695 |
| 4,993,796 A | * | 2/1991 | Kapany et al. ................ 398/82 |
| 5,009,477 A | * | 4/1991 | Alferness et al. ............. 385/17 |
| 5,228,103 A | * | 7/1993 | Chen et al. .................... 385/14 |
| 5,233,453 A | * | 8/1993 | Sivarajan et al. ............. 398/55 |
| 5,253,319 A | * | 10/1993 | Bhagavatula ................ 385/129 |
| 5,346,583 A | * | 9/1994 | Basavanhally ............... 216/26 |
| 5,412,506 A | * | 5/1995 | Feldblum et al. ........... 359/569 |
| 5,463,498 A | * | 10/1995 | Gal et al. ..................... 359/622 |
| 5,469,277 A | * | 11/1995 | Kavehrad et al. ............. 359/15 |
| 5,546,483 A | * | 8/1996 | Inoue et al. .................... 385/14 |
| 5,748,811 A | * | 5/1998 | Amersfoort et al. .......... 385/15 |
| 5,963,682 A | * | 10/1999 | Dorschner et al. ........... 385/16 |
| 5,966,476 A | * | 10/1999 | Hwang et al. .................. 385/3 |
| 5,982,515 A | * | 11/1999 | Stone et al. ................. 398/161 |
| 5,999,672 A | * | 12/1999 | Hunter et al. ................. 385/37 |
| 6,097,859 A | * | 8/2000 | Solgaard et al. .............. 385/17 |
| 6,141,152 A | * | 10/2000 | Trouchet ...................... 359/634 |
| 6,259,833 B1 | * | 7/2001 | Doerr et al. .................. 385/17 |
| 6,266,464 B1 | * | 7/2001 | Day et al. ..................... 385/37 |
| 6,271,970 B1 | * | 8/2001 | Wade .......................... 359/618 |
| 6,445,844 B1 | * | 9/2002 | Neukermans et al. ......... 385/18 |
| 6,504,966 B2 | * | 1/2003 | Kato et al. .................... 385/16 |
| 6,512,863 B1 | * | 1/2003 | Lewis .......................... 385/18 |
| 6,571,034 B2 | * | 5/2003 | Bhagavatula ................ 385/27 |
| 6,580,846 B1 | * | 6/2003 | Burroughs et al. ........... 385/16 |
| 6,597,841 B1 | * | 7/2003 | Dingel ........................ 385/37 |
| 6,618,517 B2 | * | 9/2003 | Ducellier et al. ............. 385/17 |
| 6,671,433 B2 | * | 12/2003 | Kashihara et al. ............ 385/37 |
| 6,718,084 B1 | * | 4/2004 | Wang .......................... 385/17 |
| 6,754,410 B1 | * | 6/2004 | Doerr et al. .................. 385/16 |

OTHER PUBLICATIONS

Dragone, C., "Optimum Nonblocking Networks for Photonic Switching", invited paper, Millennium Issue of the IEEE Journal of Selected Topics in Quantum Electronics, Nov./Dec. 2000.

* cited by examiner

*Primary Examiner*—Ellen E. Kim

(57) ABSTRACT

An N×N crossconnect switch is implemented without the use of waveguide crossings. In one embodiment, the N×N crossconnect switch uses two non-parallel planar arrays of 1×2 and 2×1 switching elements combined with a cylindrical reflector. In another embodiment, the N×N crossconnect switch includes an input planar array and output planar array implemented on a single wafer both having a refractive index n>1 separated by a central region having a refractive index $n_0 = 1$.

11 Claims, 8 Drawing Sheets

N×N SWITCHING ARRANGEMENT OF TWO PLANAR ARRAYS WITHOUT WAVEGUIDE CROSSINGS

TECHNICAL FIELD OF THE INVENTION

This invention relates to N×N optical crossconnect switches, and more particularly, to an N×N crossconnect switching arrangement of two planar arrays without waveguide crossings.

BACKGROUND OF THE INVENTION

In high capacity optical networks, an essential device is the N×N crossconnect switch. The function of this device is to provide at each node full connectivity among several incoming fibers, each carrying several wavelength channels. The switch must be nonblocking, and it must be fast and efficient [1–3]. These properties can be realized with minimal depth 2log N and low crosstalk by using a crossbar arrangement of binary trees, consisting of 2N(N−1)1×2 and 2×1 elements [1–3]. This approach, however, is difficult to realize in integrated form on a single wafer, because of its large number of waveguide crossings.

What is needed is an N×N crossconnect switch, which can be implemented without the use of waveguide crossings.

SUMMARY OF THE INVENTION

In accordance with the present invention, we describe an N×N crossconnect switch that can be implemented without the use of waveguide crossings. Since it is free of waveguide crossings, and it is essentially equivalent to the classical crossbar arrangement, it may be superior to previous arrangements based on integrated optics. In one embodiment, our N×N crossconnect switch uses two separate imaging arrangements consisting of two planar arrays of 1×2 and 2×1 switching elements combined with a cylindrical reflector. In another embodiment, the N×N crossconnect switch includes an input planar array and output planar array implemented on a single wafer both having a refractive index n separated by a central region having a refractive index $n_0 < n$.

More generally, our N×N optical interconnection arrangement comprises a first and second planar array, the first array including N imaging elements, each imaging element having N input waveguides coupled thereto, the second array including N imaging elements, each imaging element having N output waveguides coupled thereto and wherein each input waveguide of a particular imaging element of the first array is coupled to a unique output waveguide of a corresponding imaging element of the second array.

The N×N optical interconnection arrangement may be implemented using input and output arrays formed on a single wafer or by using input and output arrays formed on separate wafers coupled together with a cylindrical reflector. An N×N optical switch is formed by adding a 1×N switch array to each transmitting element and an N×1 switch array connected to each receiving element of the N×N optical interconnection arrangement.

BRIEF DESCRIPTION OF THE DRAWINGS

In the drawings.

In the following description, identical element designations in different figures represent identical elements. Additionally in each element designation, the first digit refers to the figure in which that element is first located (e.g., 104 is first located in FIG. 1).

DETAILED DESCRIPTION

1. Imaging Arrangement of Two Arrays of Binary Trees

The classical N×N crossconnect switch arrangement consists of a 1×N switch array and an N×1 switch array, which requires a total of $N^2$ connections, between the various switches. The $N^2$ connections make the arrangement difficult to realize in integrated form for large N on a single wafer, because of the large number of waveguide crossings required by the various connections. In the present application we propose, as a remedy to this problem, a planar imaging arrangement of two arrays combined with a cylindrical reflector. We first describe an equivalent arrangement without cylindrical reflector. Thus, we initially assume a planar free-space between the two arrays. The following configuration is closely related to the confocal arrangement used in [4]. Here we consider an arrangement of switches, but the following considerations also apply to any crossbar switching arrangement, for instance including wavelength routers instead of ordinary 1×N and N×1 switches. Thus a variety of such switching arrangements can be constructed, for instance by using ordinary 1×N and N×1 switches for both arrays, a 1×N switch for the first array and wavelength routers for the second array, wavelength routers for the first array and N×1 switches for the second array, or using wavelength grating routers for both arrays. The 1×N and N×1 switch arrangements may be implemented as described in pending U.S. patent application Ser. No. 09/687,346, filed on Oct. 13, 2000 and entitled "LARGE N×N OPTICAL SWITCH USING BINARY TREES." The wavelength routers may be implemented as described in U.S. Pat. No. 5,136,671, issued on Aug. 4, 1992 and entitled "OPTICAL SWITCH, MULTIPLEXER, AND DEMULTIPLEXER."

Figure 1:
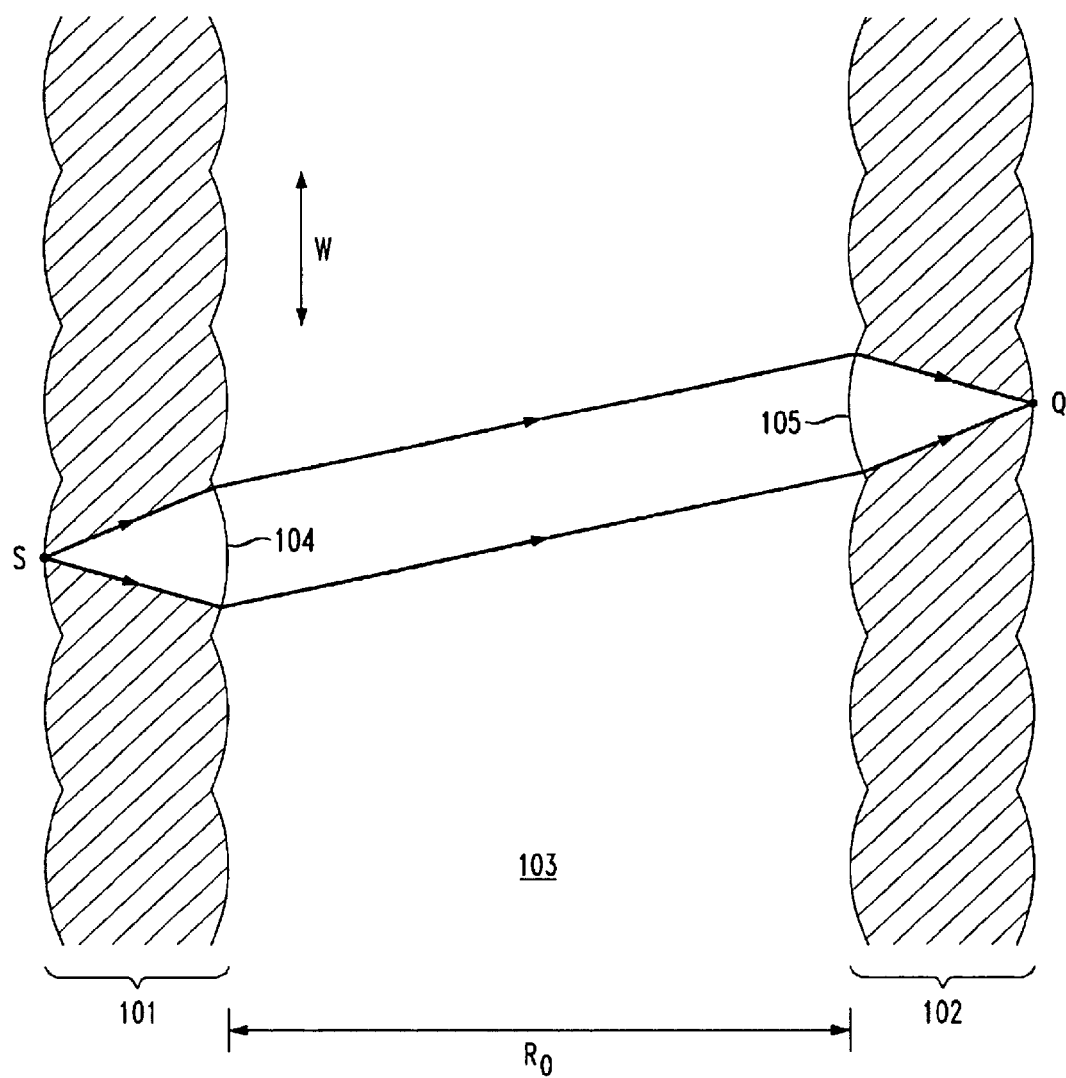
FIG. 1 illustrates an imaging arrangement of two periodic slabs.
Figure 2:
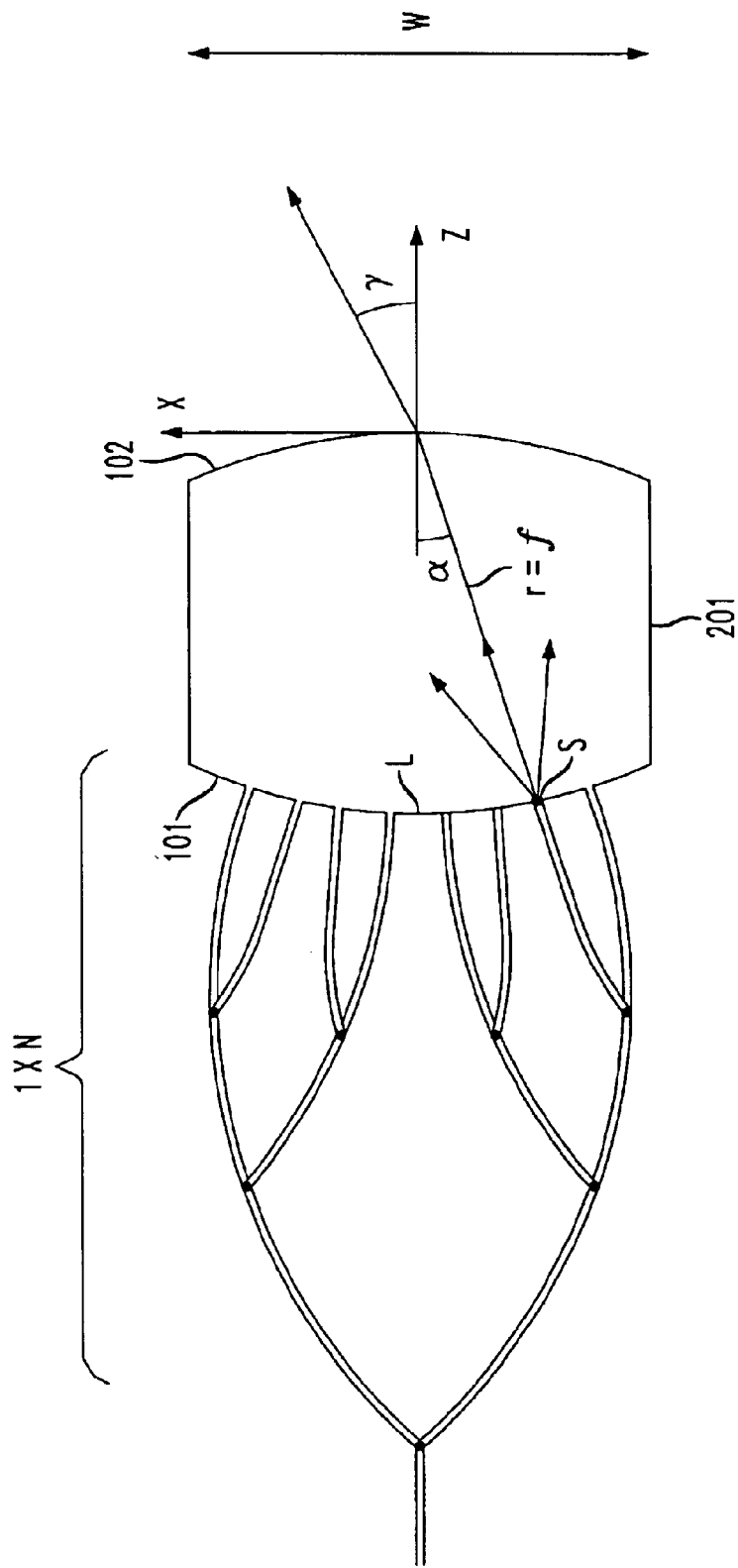
FIG. 2 shows an array element combined with an input 1×N switch.

We first consider a symmetric arrangement of two identical arrays of imaging elements 101 and 102 located on a plane as shown schematically in FIG. 1. Such an arrangement may be desirable for small N, since the arrangement can be realized on a single wafer. We assume refractive index $n_0$ in the central region 103 between the two arrays, and index $n > n_0$ in the regions occupied by the imaging elements. Imaging (from source S to destination Q) by each array element is simply performed by the curved edge separating each array from the central region. The edge is made up of N sections, and each section is combined with a 1×N switch as shown in FIG. 2. Here we assume propagation from left to right but the arrangement is bi-directional. The purpose of the arrangement of FIG. 1 is to transmit each input signal, e.g. S, applied to a particular element 104 of the transmitting array 101, to a point Q of a particular receiving element 105 of the other array 102. Each transmitting element of array 101 can efficiently transmit to any one of the N receiving elements of array 102, and each receiving element can efficiently receive from any of the N transmitting elements. As shown in FIG. 2, each transmitting element of array 201 connects to N output ports of the 1×N switch and a similar arrangement is used for the receiving array 102 (not shown) but which is simply the mirror image of the transmitting array 101. Each imaging element in FIG. 2 connects to the N waveguides of the 1×N switch, which are located close to the focal curve of the refractive edge L of array 101. Similar considerations apply to each receiving element of array 102, which again consists of refractive curve L connected to N receiving waveguides, which are now connected to a N×1 switch.

Figure 3:
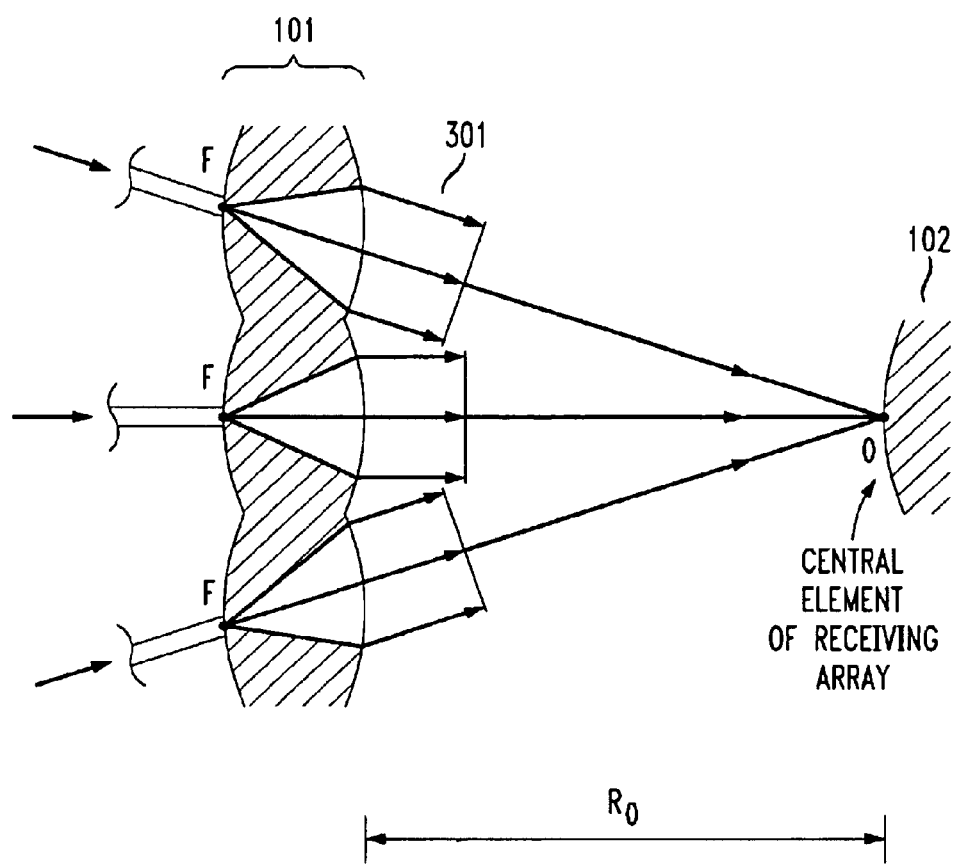
FIG. 3 shows that each transmitting (or receiving) array element can be characterized by a perfect focal point F.

With reference to FIG. 3, we describe the optimization of the imaging arrangement of FIG. 1. Each array 101 and 102 includes N elements. We minimize aberrations by producing a nearly perfect focal point F for each element. Thus, we choose the profile of each diffracting edge L so that all rays from a point source located at F are approximately transformed, after refraction, into parallel rays 301, directed towards the central element of the receiving array 102. As a result, each array is characterized by N focal points, and efficient transmission between the elements of the two arrays is realized by simply placing in the vicinity of each focal point N waveguides. The resulting arrangement is then capable of providing $N^2$ connections. Each optical connection is formed as shown schematically in FIG. 4, by an imaging arrangement of two refracting curves 401, 402 combined with two waveguides 403, 404. In this arrangement, maximum efficiency in the absence of aberrations requires the apertures of the two waveguides to be placed in the vicinity of the focal curves of the two refracting curves. Therefore the optimum profile for either curve is derived to a good approximation (as described in the following paragraphs), by illuminating the curve with a point source located on the focal curve.

Figure 4:
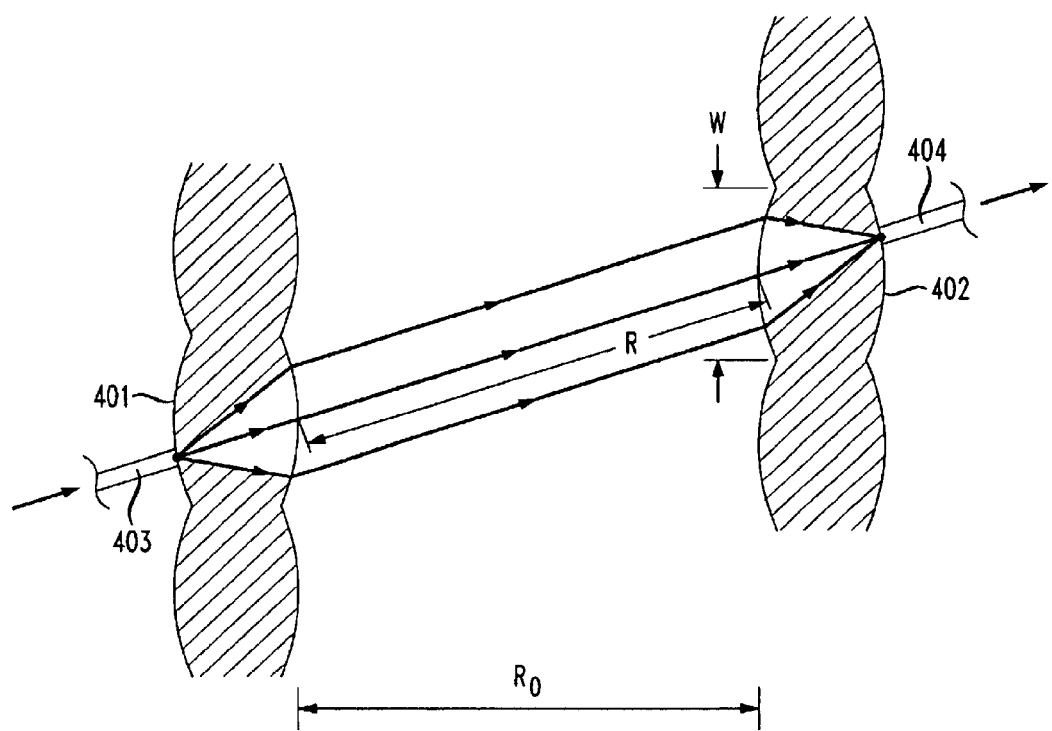
FIG. 4 shows the imaging between two particular array elements.
Figure 6:
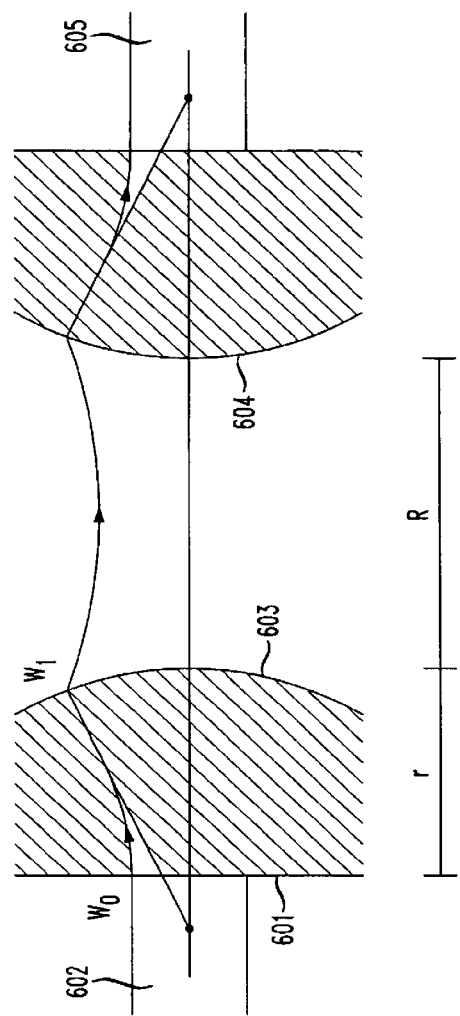
FIG. 6 shows a confocal arrangement.

Notice FIGS. 1, 3, 4 only show a schematic representation of imaging according to geometric optics. The actual rays in practice are curved, because of diffraction, as shown for instance in FIG. 6, as is well known from the laws of Gaussian Optics. Also notice that each waveguide is actually displaced from the focal curve of the imaging element. The displacement is typically small, and it varies depending on the particular design. Its optimum value is obtained in each case by maximizing the transmission coefficient from a particular input waveguide to the corresponding output waveguide. As disclosed later two different optimizations are obtained, depending on whether or not a wide wavelength range of efficient performance is specified.

1.1 Imaging by a Refractive Curve.

With reference to FIG. 2, consider a particular transmitting element, and let it's refracting edge be illuminated by a point source S. Let r be the focal length f and $\alpha$, $\gamma$ be the angles of incidence and refraction for the principal ray through the center C of the refracting edge L. In order to obtain parallel rays after refraction, the edge profile $z = z_0(x)$ must satisfy the condition $p=0$, where p is the aberration function $$p = p_1 - p_2 = n((x + r \sin \alpha)^2 + (z_0(x) + r_0 \cos \alpha)^2 - r) - (x \sin \gamma + z_0(x) \cos \gamma), \quad (1)$$

assuming refractive index n before refraction, and unity index after refraction. Notice the first term is contributed by the optical path $p_1$ from S to the refractive edge and, the second term $p_2$ is contributed by the optical path from the refractive edge to a plane orthogonal to the direction specified by $\gamma$. Here we specify the above condition for some particular values $r_0$, $\alpha_0$, $\gamma_0$ of r, $\alpha$, $\gamma$ satisfying $$n \sin \alpha_0 = \sin \gamma_0, \quad (2)$$

and obtain for $z = z_0(x)$ an ellipse with one of its two foci coincident with F. The resulting aberrations p for $\gamma_0 \neq \gamma$ can be determined accurately from the expression (1), and they can be minimized by properly choosing r, $\alpha$ for each $\gamma$ of interest, corresponding to a particular connection with the receiving array. By expanding p in powers of x we eliminate terms of order two by choosing $$r = \frac{(n \cos \alpha_0 - \cos \gamma_0) \cos^2 \alpha}{(n \cos \alpha - \cos \gamma) \cos^2 \alpha_0} r_0 \quad (3)$$

Then letting $$\sin \alpha = \frac{1}{n} \sin \gamma + \sin \delta \alpha, \quad (4)$$

we obtain accurately $$p \approx \frac{(\sin \gamma - \sin \gamma_0) x^3}{2 r^2} + n x \delta \alpha, \quad (5)$$

and determine the optimum $\delta \alpha$ that minimizes the maximum aberration $p_{max}$ over the diffracting edge aperture. For an aperture width w we obtain $$\delta \alpha = -\frac{\sin \alpha - \sin \alpha_0}{8(n-1)} w^2, \quad (6)$$

giving $$p_{MAX} \approx \frac{(\sin \gamma - \sin \gamma_0) w^3}{24 \sqrt{3} r^2}. \quad (7)$$

Notice that aberrations must be minimized over the entire field of view corresponding to the $\gamma$—interval occupied by the receiving array. Therefore the optimum $\gamma_0$ in the above expression is simply the value corresponding to the center of the receiving array. Then, according to the above expression, all array elements are essentially characterized by the same aberrations.

1.2 Optimum Arrangements

Figure 5:
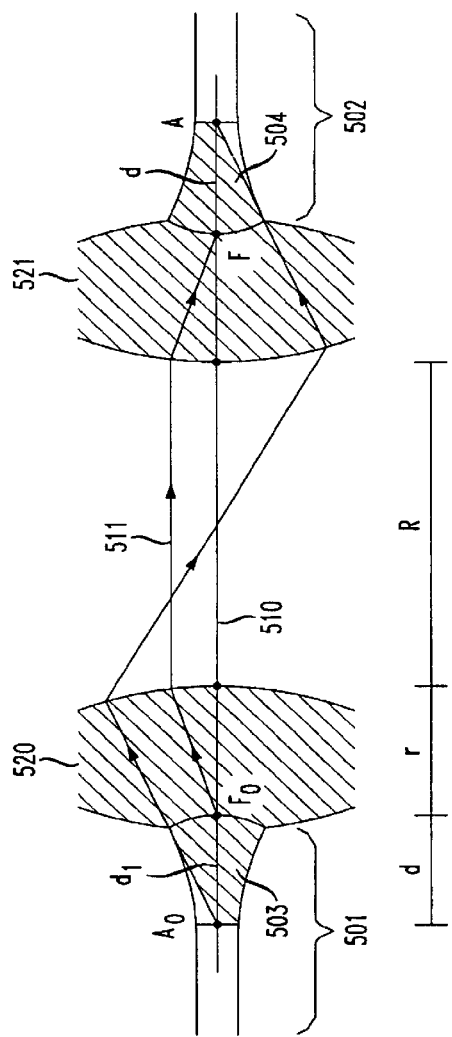
FIG. 5 shows the imaging conditions that must be satisfied between two conjugate tapers.

We now derive the conditions that must be satisfied in order to match each input waveguide to the corresponding output waveguide. We initially consider for simplicity the particular case $\gamma = 0$, but the following considerations apply in general. The following description makes reference to FIG. 5 and considers a particular connection formed between two particular waveguides 501 and 502. Note that FIG. 5 is not shown to scale in order to clarify the details of the geometry. FIG. 5 shows the connection between two waveguides 501 and 502, as in FIG. 4, except that in FIG. 5 the waveguides include tapers 503 504 at the junctions with the free-space regions 520, 521. Notice the tapered section of each waveguide has its aperture centered at $F_0$. The purpose of the taper is to produce over its aperture a curved wavefront centered at $A_0$, which will be referred to as the phase center of the taper. One would like the mode of the input waveguide 501 to be accurately reproduced over the receiving waveguide 502 aperture. Both amplitude and phase must be matched and, ideally, the match should be wavelength independent. This strictly requires the input mode and its corresponding replica to be produced on conjugate curves satisfying two conditions. First the axial points $F_0$, F of the two curves must be conjugate points (either point must be the image of the other). Second, the centers of curvatures $A_0$, A of the two curves must also be conjugate points. The former condition is needed to guarantee the amplitude match, and it is realized by placing each curve through the focal point of the refracting curve, as shown by 510 for $\gamma=0$ in FIG. 5. The latter condition is needed to insure the phase match, and it requires suitable tapers 503, 504 as shown in FIG. 5. Notice as shown by 511, for $\gamma\neq 0$, FIG. 5 must be modified by allowing a nonzero angle of incidence on each refractive curve. Then the two focal points are located on the two focal lines specified by the expression (3).

The purpose of the input taper 503 in FIG. 5 is to illuminate the waveguide aperture with a curved phase front centered at the apex $A_0$ of the taper. The output taper 504 is simply the mirror image of the input taper and, in order to produce over its receiving aperture the appropriate phase distribution, its apex A must be the image of $A_0$. Therefore, from the lens equation, the taper length $d=A_0F_0=AF$ must satisfy $$d = \frac{r^2}{n\frac{R}{2} - r}, \qquad (8)$$

where R is the distance between the two array elements, and r is the focal length of expression (3). Notice d is the radius of curvature of the phase fronts at $F_0$, F.

The values of $\gamma$, R are determined by the distance $R_0$ between the two arrays and the lateral displacement of the two elements. FIG. 4 illustratively shows R and $R_0$ for two elements that are laterally displaced. For a lateral displacement by i elements, $$\tan\gamma = \frac{iW}{R_0}$$

and $$R = \sqrt{R_0^2 + (iW)^2},$$

where W is the total element aperture width, which is typically somewhat greater than the aperture illumination width w considered earlier.

From expression (6) one can determine the maximum field of view width $\Omega$, obtained by specifying less then $\lambda/4$ maximum error. For instance, by using silica waveguides with aperture width of 15 $\mu$m and r=4000 $\mu$m, one obtains $\Omega=1.75$ for $\lambda=1.55$ $\mu$m.

The above conditions are required to insure a good match over a very wide wavelength range. In most cases, however, a good match is only required in the vicinity of a particular wavelength $\lambda=\lambda_0$. Then the design can be simplified and, in particular, the above tapers (503, 504 shown in FIG. 5) are not needed. In fact, a perfect match at a particular wavelength only requires a constant phase distribution on the symmetry axis of the arrangement. This condition, which is a general property of any symmetric arrangement, can be satisfied accurately by approximating the input mode with a Gaussian distribution. Then the above condition simply requires the resulting beam waist between the two refractive curves to be exactly produced in the middle, on the symmetry axis. This requirement, which was satisfied by the FIG. 5 imaging arrangement, can now be satisfied in many different ways. One way uses a confocal arrangement shown in FIG. 6. In the FIG. 6 arrangement, we specify the input curve 601 to be a straight line and one can show that the optimum arrangement for our purpose here is then obtained by choosing the beam radius $w_1$ on the two refracting curves so that approximately $$\frac{\lambda_0 R}{\pi w_1^2} \simeq 1,$$

which can be shown to minimize $w_1$ for a given R. Typically, R is appreciably larger than the focal length r of the two refractive curves, and $$\frac{\pi w_0^2}{\lambda_0 r_0} \ll 1$$

where $w_0$ is the beam radius over the waveguide 602 aperture. Under the above conditions, the first refractive curve 603 is accurately illuminated by the Fourier transform of the input mode and, the other curve 604, by a magnified image of the input mode. Therefore, a perfect match between the two waveguides 601, 605 is not possible. This would strictly require, in view of the arrangement symmetry, the two illuminations to be identical at all wavelengths. Instead, the width of the first illumination is a linear function of the wavelength $\lambda$, whereas the second width is wavelength independent, and therefore the two widths can only be matched in the vicinity of a particular wavelength $\lambda_0$. In spite of this disadvantage, as compared to the previous imaging arrangement, the confocal arrangement is generally preferable, because it minimizes the beam radius $w_1$ on the refractive surface.

2. Imaging Arrangement of Two Arrays and a Cylindrical Reflector

Figure 7:
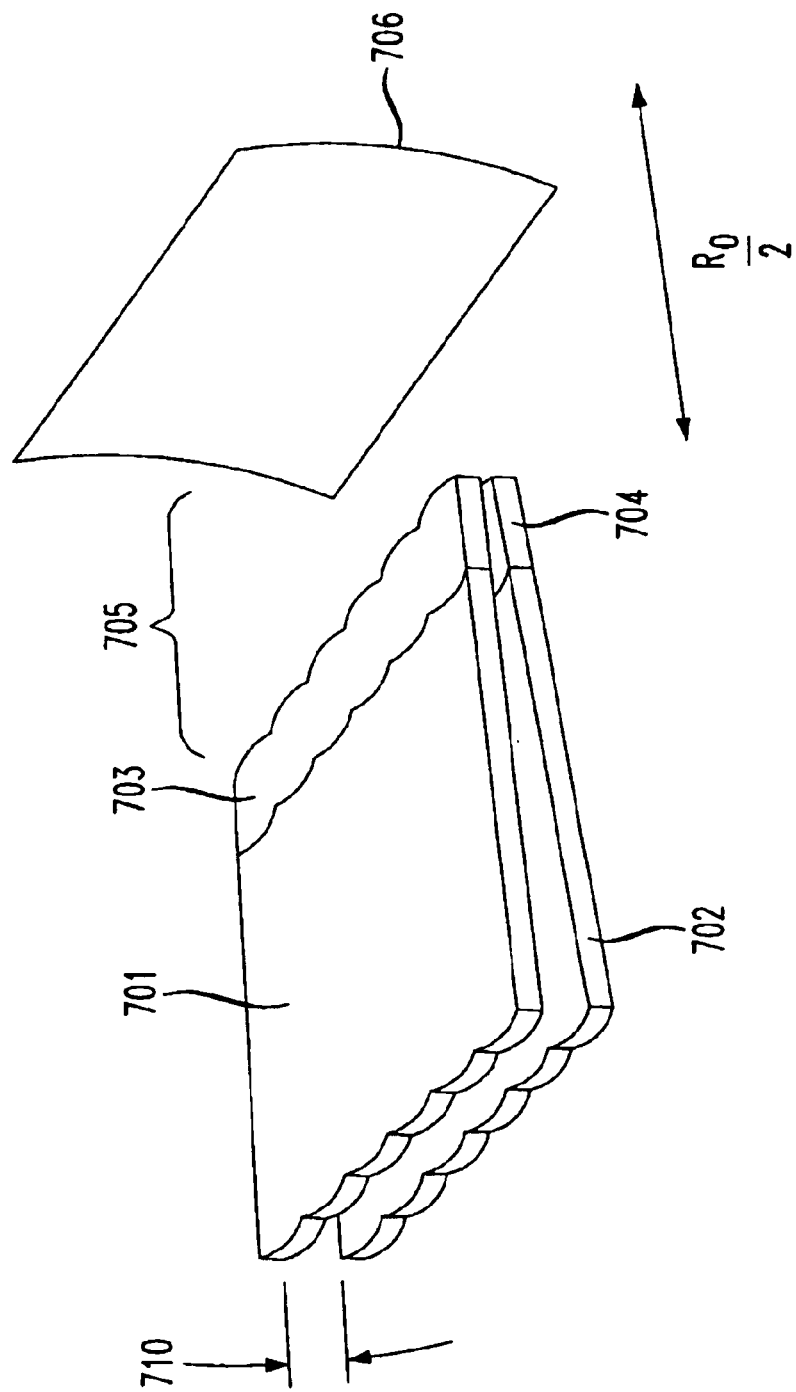
FIG. 7 shows two planar wafers combined with a circular cylinder reflector.
Figure 8:
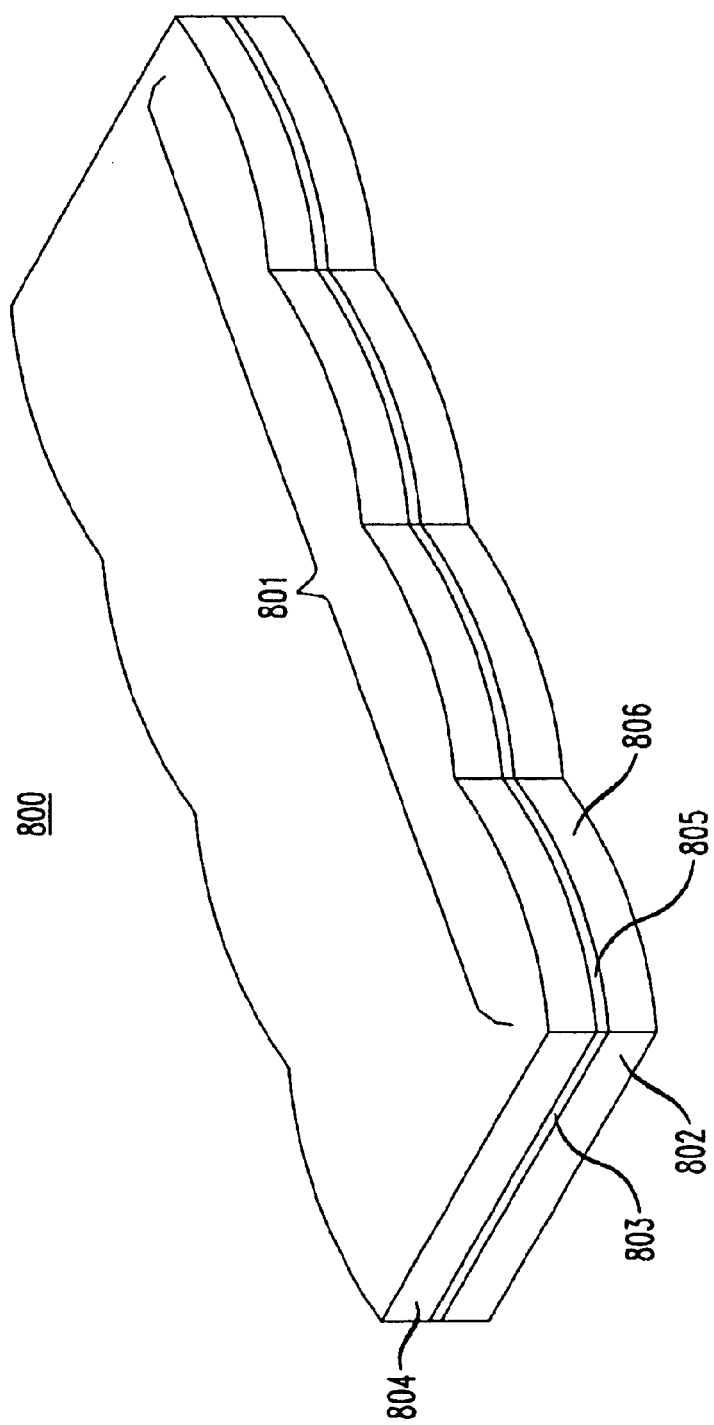
FIG. 8 shows a planar wafer with a nearly periodic profile formed by etching.

We now assume that the medium in the region 103 of FIG. 1 is ordinary free-space and combine the two arrays with a cylindrical lens, or equivalently a reflector as shown in FIG. 7. Shown in FIG. 7 is a cylindrical reflector 706, and two wafers 701 and 702, each including identical imaging arrays 703, 704 and their associated switches or routers. We assume that the reflector 706 is characterized by two focal lines, such that a cylindrical wave originating from either line is transformed after reflection into a cylindrical wave converging towards the second line. To implement the FIG. 7 arrangement, the transmitting array 703 must be implemented to now behave as a line source, and similarly the receiving array 704, must have the conjugate (mirror image) behavior. We can realize the curved profile of expression (3) by precision etching a cylindrical surface with approximately periodic profile as shown in FIG. 8 for the transmitting 703 and receiving 704 arrays. Shown in FIG. 8 is an illustrative transmitting array 800 with a cylindrical surface with approximately periodic element profile 801 which is shown as a slab which includes a lower cladding region 802, a core region 803 and an upper cladding region 804. Notice the curved edge 805 of the core in FIG. 8 is shown for simplicity on the curved cylindrical surface 806 of the wafer.

Figure 9A:
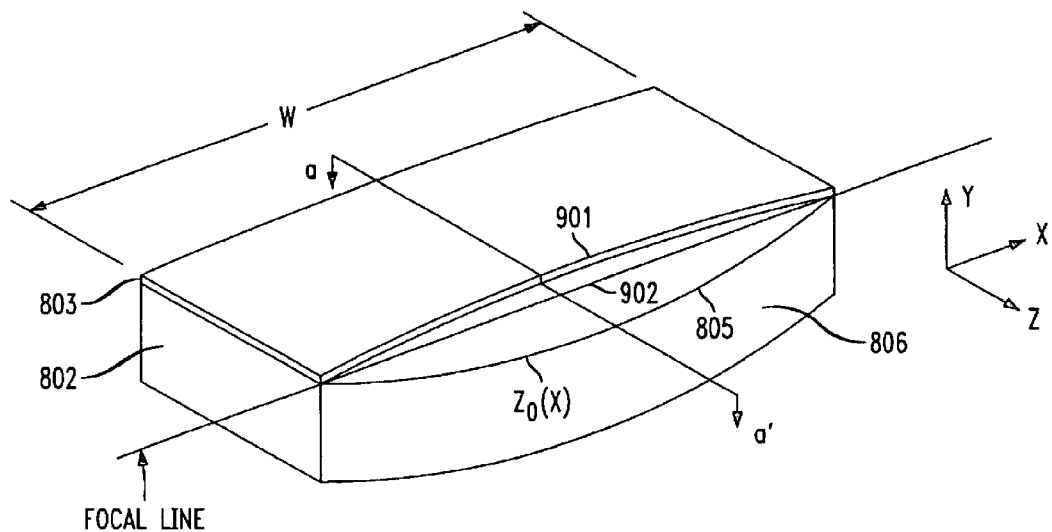
FIG. 9A shows a cross-section, a-a', of FIG. 9 as viewed in the X-direction.
Figure 9B:
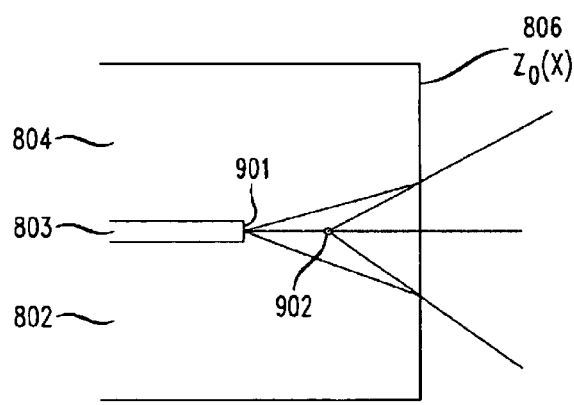
FIG. 9 shows a planar wafer formed to produce a straight focal line.

In practice the core edge must be displaced from the cylindrical surface for the following reason. In FIG. 8, an optical signal traveling in the core region 803 between the lower 802 and upper 803 cladding regions would produce, after diffraction by the cylindrical surface, a diffracted wave essentially emanating from the edge 805 of core region 803. In this case, since radiation from the core region 803 would emanate from the curved edge 805 of each of the array elements 801, this would cause each element to effectively behave as a curved line source, formed by the curved edge 805 of the core region 803 of the slab. What is desired here is to produce a straight-line source rather than a curved line source. Therefore, in order to produce a straight-line source, the curved edge of the core region must be modified as shown in FIG. 9. In FIG. 9, to better illustrate the modification to the core region 803 the upper cladding region 804 of the slab 800 (which has the same shape as the lower cladding region 802) is not shown. By properly choosing the edge profile 901 of the core region, we cause its virtual image produced by the cylindrical surface 806 to become a straight line 902. This simply requires the edge profile 901 to be $z_1-(z_0(x)-z_1)/n$, where $z_0(x)$ denotes the cylindrical lens profile 805 specified by the expression (1) for p=0 and $z_1$ is the (negative) coordinate of the focal line. Shown in FIG. 9A is a cross-section (a-a') of FIG. 9 (as viewed in the X-direction) and a virtual image 902 formed by the diffracted rays emanating from the edge 901 of the core 803. Notice the cylindrical profile $z_0(x)$, 805, must have good optical quality, but it need not be exactly orthogonal to the plane X, Z of the wafer. After deposition of the lower cladding 802, the core region 803 is deposited and etched to the profile 901. Then, the upper cladding 805 is deposited and thereafter the profile 805 is etched vertically, in direction Y, down the face of the slab (through the upper cladding 804, core region 803, and lower cladding 802). During this process however, precise alignment is not required, and errors as large as a few microns can be tolerated.

Once two arrays characterized by straight focal lines are realized, perfect imaging between the two focal lines is obtained by simply using an elliptical cylinder with its focal lines coincident with those of the two arrays. The complete arrangement is illustrated in FIG. 7. The angle 710 between the two arrays 703 and 704 is typically very small, and therefore a circular reflector 706 can be used with negligible aberrations.

The above arrangement is essentially free of aberrations. An estimate of its dimensions can be made as follows. The width W of each element is primarily determined by the width of each 1×N and N×1 switch, and it can be expressed as $$w = NS$$

where the average spacing S can be about 50 microns. The total width for each array is $W=N^2S$ cm, and the distance $R_0/2$ of the two arrays from the cylindrical reflector of FIG. 10

$$\frac{R_0}{2} = \frac{N^2 S}{2\Omega} \approx 145 N^2, \text{ microns}$$

for $\Omega=0.175$. For instance, for N=32, $$W \approx 5 \text{ cm}, \frac{R_0}{2} \approx 14.5 \text{ cm}.$$

3. Concluding Remarks

To conclude, it is possible to realize large N×N optical crossconnect switches by using a planar arrangement of 1×N and N×1 switches (or routers) combined with 2N imaging elements. The imaging elements are not simple to realize but, in spite of this, the arrangement is attractive because of its expected good performance, since it is equivalent to the classical crossbar arrangement, and it is free of waveguide crossings. For small N, the arrangement can be realized on a single wafer by using two arrays of waveguide lenses (FIG. 1), instead of using a cylindrical reflector arrangement (FIG. 7). However, our derivation of the optimum matching conditions applies to both cases.

Efficient power transfer between two identical waveguides requires in general the aperture distribution of either waveguide to be a replica of the other. To this purpose, one can either use the imaging arrangement of FIG. 5 or the confocal arrangement [4] as in FIG. 6. The imaging arrangement of FIG. 5 is attractive because it is very efficient over a very wide range of wavelengths, but it requires tapered waveguides, in order to insure that the phase distribution over either aperture is the mirror image of the other. It turns out that the phase errors produced in the above imaging arrangement without tapers are typically small. Nevertheless, the confocal arrangement is preferable, in general, since it does not require tapers and it minimizes the illumination width on each refractive curve. Then, however, the two aperture distributions are related by a Fourier transformation, which causes a small mismatch between the two distributions.

Finally, an important consideration of 1×N and N×1 switches, which use thermoptic switches, is the total power dissipation. For the classical crossbar 1×N and N×1 switch arrangement, either array requires (N−1)1×2 switching elements but only N $\log_2$ N of these need be turned on at any given time. Therefore assuming for instance 0.4 watts per switch, a total of 25.6 watts would be required for a 16×16 switch.

REFERENCES

[1] Alferness, R. C., "Guided-wave Devices for Optical Communications," IEEE J. Quantum Electron., Vol. QE-17, pp. 946–957, 1981.

[2] Padmanabhan, K., and Netravali, A., "Dilated Networks for Photonic Switching," IEEE Transactions on Communications, Vol. COM-35, No. 12, pp. 1357–1365, December 1987.

[3] Dragone, C., "Optimum Nonblocking Networks for Photonic Switching", invited paper, Millennium Issue of the IEEE Journal of Selected Topics in Quantum Electronics.

[4] Doerr, C., R., and Dragone, C., "Proposed Optical Crossconnect Using a Planar Arrangement of Beam Steerers", IEEE Photon. Technol. Lett., Vol.11, No.2, pp.197–109, February 1999.

[5] Goh, T., Himeno, A., Okuno, M., Takahashi, H., and Hattori, K., "High-Extinction Ratio and Low Loss Silica-Based 8×8 Thermooptic Matrix Switch," IEEE Photon. Technol. Lett., Vol. 10, No. 3, pp. 358–360, March 1998.

We claim:

1. An N×N optical interconnection arrangement, where N is an integer greater than one, comprising a first and second planar array,
   the first array including N planar imaging elements, each imaging element having N planar input waveguides coupled thereto,
   the second array including N planar imaging elements, each imaging element having N planar output waveguides coupled thereto and wherein
   each input waveguide of a particular imaging element of the first array is coupled to a unique output waveguide of a corresponding imaging element of the second array.

2. The N×N optical interconnection arrangement of claim 1 wherein the two planar arrays are implemented on a single wafer separated by a central region and wherein the central region has a refractive index $n_0$ and the two planar arrays have index $n > n_0$.

3. The N×N optical interconnection arrangement of claim 2 wherein each of the imaging elements of the two arrays has a refracting curve with suitable focal length.

4. The N×N optical interconnection arrangement of claim 3 wherein the aperture of each output waveguide is essentially the image of the aperture of the corresponding input waveguide and the phase center of the output waveguide is essentially the image of the phase center of the input waveguide, so as to realize a broadband match between the two waveguides according to the laws of imaging.

5. The N×N optical interconnection arrangement of claim 3 wherein the locations of each pair of corresponding waveguides are optimized so as to maximize power transfer between the two waveguides.

6. The N×N optical interconnection arrangement of claim 3 wherein the location of each input waveguide is properly chosen so that the phase front produced after refraction by the first refractive element has its center of curvature essentially located at the second refractive element.

7. An N×N optical interconnection arrangement, where N is an integer greater than one, comprising a first and second planar array,
   the first array including N planar imaging elements, each imaging element having N planar input waveguides coupled thereto,
   the second array including N planar imaging elements, each imaging element having N planar output waveguides coupled thereto,
   wherein each input waveguide of a particular imaging element of the first array is coupled to a unique output waveguide of a corresponding imaging element of the second array, and
   wherein a particular imaging element of the first array is coupled to the corresponding imaging element of the second array using a cylindrical reflector.

8. The N×N optical interconnection arrangement of claim 7 wherein each imaging element of either array is realized on a planar wafer and it comprises
   a diffractive element formed by a curved cylindrical edge of the wafer and
   a core layer formed in the vicinity of the cylindrical edge,
   wherein the edge of the core layer and the cylindrical edge have different profiles arranged so that
   radiation from the first array emanates from a virtual focal line that is a straight line common to all imaging elements of the first array, and
   the second array is similarly arranged so that it is characterized by a straight focal line if the sense of transmission is reversed.

9. The N×N optical interconnection arrangement of claim 8 wherein either focal line is transformed by the cylindrical reflector into an image produced at the other focal line.

10. The N×N optical interconnection arrangement of claim 1 further comprising
    N optical 1×N switch arrays, each 1×N switch array connected to a different transmitting element of the first array, each 1×N switch array having an input for receiving an optical signal and N outputs, where each of the N output connect to a different input of the same transmitting element of the first array and
    N optical N×1 switch arrays, each N×1 switch array connected to a different receiving element of the second array, each N×1 switch array having N inputs for receiving optical signals and an output for outputting an optical signal, where each of the N inputs connect to a different output of the same receiving element of the second array.

11. The N×N optical interconnection arrangement of claim 10 wherein one or both of the 1×N and N×1 switch arrays are formed using a switch array implemented using (1) 1×2 and/or 2×1 switching elements, (2) wavelength routers, or (3) a combination of 1×2 and/or 2×1 switching elements and/or wavelength routers.

* * * * *